US006701455B1

(12) United States Patent
Yamamoto et al.

(10) Patent No.: US 6,701,455 B1
(45) Date of Patent: Mar. 2, 2004

(54) REMOTE COPY SYSTEM WITH DATA INTEGRITY

(75) Inventors: Akira Yamamoto, Cupertino, CA (US); Kenji Yamagami, Cupertino, CA (US)

(73) Assignee: Hitachi, Ltd. (JP)

( * ) Notice: Subject to any disclaimer, the term of this patent is extended or adjusted under 35 U.S.C. 154(b) by 500 days.

(21) Appl. No.: 09/650,217

(22) Filed: Aug. 29, 2000

(51) Int. Cl.[7] .............................................. G06F 11/00
(52) U.S. Cl. ............................... 714/18; 714/4; 714/20; 707/202
(58) Field of Search ........................... 714/18, 4, 5, 20, 714/6; 707/202

(56) References Cited

U.S. PATENT DOCUMENTS

| | | | |
|---|---|---|---|
| 5,544,347 A | | 8/1996 | Yanai et al. |
| 5,692,155 A | * | 11/1997 | Iskiyan et al. ............... 711/162 |
| 5,742,792 A | | 4/1998 | Yanai et al. |
| 5,754,754 A | * | 5/1998 | Dudley et al. ................. 714/18 |
| 6,065,018 A | * | 5/2000 | Beier et al. .................. 707/202 |
| 6,098,180 A | * | 8/2000 | Kobata et al. ................. 714/18 |
| 6,212,240 B1 | * | 4/2001 | Scheibel et al. ............. 375/261 |
| 6,463,501 B1 | * | 10/2002 | Kern et al. .................. 711/100 |
| 6,484,187 B1 | * | 11/2002 | Kern et al. .................. 707/204 |
| 6,526,418 B1 | * | 2/2003 | Midgley et al. ............. 707/204 |
| 6,543,001 B2 | * | 4/2003 | LeCrone et al. ................ 714/6 |
| 2002/0038314 A1 | * | 3/2002 | Thompson et al. .......... 707/202 |

* cited by examiner

Primary Examiner—Scott Baderman
(74) Attorney, Agent, or Firm—Townsend and Townsend and Crew LLP

(57) ABSTRACT

A storage system is provided which preserves data integrity, even when communications line, or similar, errors arise between the local disk system and the remote disk system. When there is no communication line error between the local disk system and the remote disk system, the local disk system sends a time stamp or the write order information with the write data to the remote disk system. This enables the remote disk system to make a copy with data integrity on the disk unit in the remote disk system itself. If there is a communication line error, the remote disk system allocates an empty disk unit and makes a copy with data integrity on the allocated disk unit after the communication line error between the local disk system and the remote disk system is detected.

12 Claims, 21 Drawing Sheets

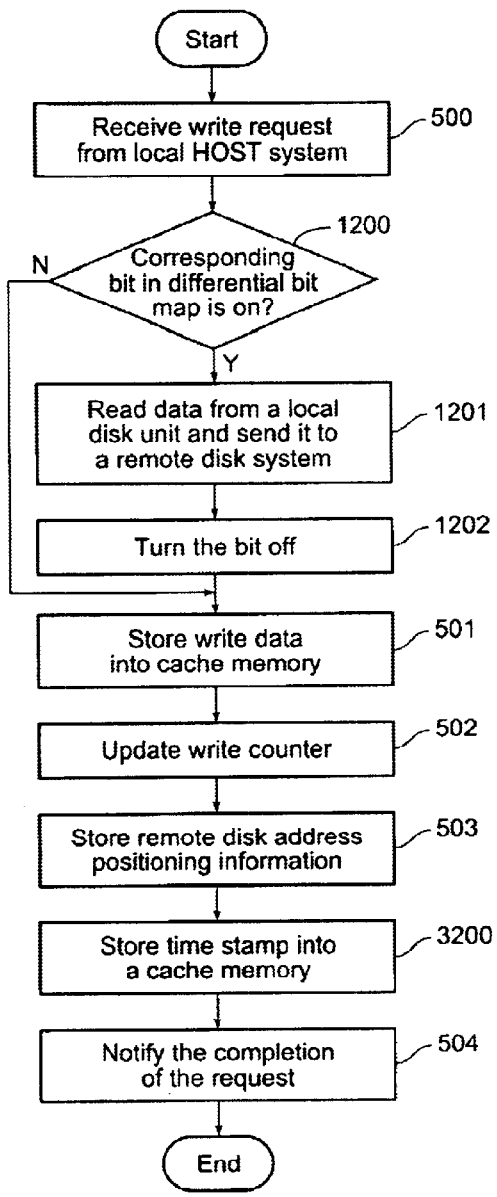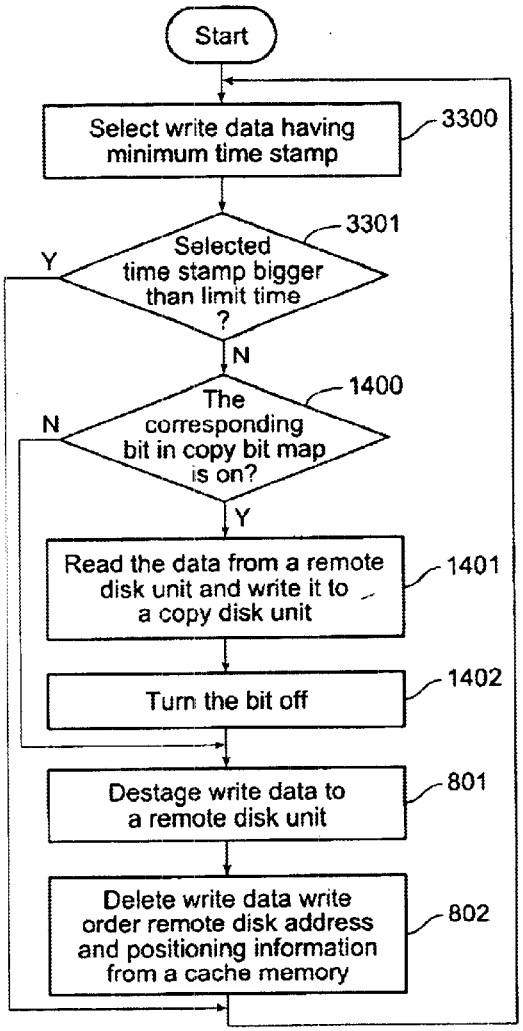
FIG. 32
FIG. 33

REMOTE COPY SYSTEM WITH DATA INTEGRITY

BACKGROUND OF THE INVENTION

This invention relates to storage systems, and in particular to storage systems for assuring data integrity across networks. The remote dual copy function is one which provides a real time copy at remote site as protection against loss of the original copy, for example, due to natural disaster or other cause of corruption or loss of the data. For this function it is very important to guarantee integrity of the data. In general there are two types of remote copy—synchronous and asynchronous. In synchronous remote copy, a local disk system completes a write request from the local host computer system. After the local disk system completes the transfer of write data received from the local host in the write request, it writes the data to the remote disk system. As a result it is relatively easy to maintain data integrity—the local and the remote systems are at worse only one write apart in having matching data.

In an asynchronous type remote dual copy system, a local disk system completes the write request from the local host before the local disk system completes the transfer of write data to the remote disk system. The write data is stored in a cache memory at the local disk system until the local disk system completes transfer of the write data to the remote disk system. In this circumstance of asynchronous dual copy, to preserve data integrity, the order of writing data to the disks in the disk system at the remote site must be the same as the order of writing data to the disk system at the local host. Thus, typically, the local disk system sends a time stamp or write order information with write data to the remote disk system. Either approach assures data integrity. Thus, the local disk system can manage the write data, the time stamp, and the writing order information corresponding to the write data all together.

A communication line or other fault between the local disk system and the remote disk system, however, may occur at times. When this happens, because the local disk system cannot send write data to the remote disk system, the local disk system may have too much write data to store in its cache memory. Then, the local disk system destages (unwrites) the write data in its own disk unit, and deletes the write data from the cache memory. After the deletion of write data from the cache memory, the local disk system is unable to manage the write data, the time stamp, and the writing order information together efficiently. Thus, it is difficult to guarantee data integrity if there happens to be a communication line, or similar, error between the local disk system and the remote disk system.

Japan patent application JP-A-11-085408 discloses asynchronous remote copy technology to guarantee data integrity by utilizing a time stamp or similar technique. It also discloses several types of remote dual copy system architectures. A first one is includes one local disk system and one remote disk system. A second architecture includes more than one local disk system and one remote disk system. A third approach is a system that includes more than one local disk system and more than one remote disk system. This Japan application, however, does not take into consideration the need to guarantee data integrity in the case where the data communication between a local disk system and remote disk system fails.

SUMMARY OF THE INVENTION

This invention provides an improved system which is more capable of preserving data integrity, even when communications line, or similar, errors arise between the local disk system and the remote disk system. In particular, this invention provides data integrity despite communication line errors between the local disk system and the remote disk system. When there is no communication line error between the local disk system and the remote disk system, the local disk system sends a time stamp or the write order information with the write data to the remote disk system. This enables the remote disk system to make a copy with data integrity on the disk unit in the remote disk system itself. If there is a communication line error, the remote disk system allocates an empty disk unit and makes a copy with data integrity on the allocated disk unit after the communication line error between the local disk system and the remote disk system is detected. By doing so, even if the transfer of write data without the time stamp or the write ordering information is executed from the disk unit in the local disk system to the disk unit in the remote disk system, the remote disk system can keep a copy with the secured disk unit.

Another benefit of the invention is that it provides for the transfer of data without the time stamp or the write ordering information from the disk unit in the local disk system to the disk unit in the remote system in parallel with the data transfer from the disk unit in the remote disk system to the newly allocated disk unit.

BRIEF DESCRIPTION OF THE DRAWINGS

FIGS. 26 to 34 are flowcharts illustrating details of the processes shown in FIGS. 21 to 25.

DESCRIPTION OF THE SPECIFIC EMBODIMENTS

1. First Embodiment—One Local and One Remote Disk System

Figure 1:
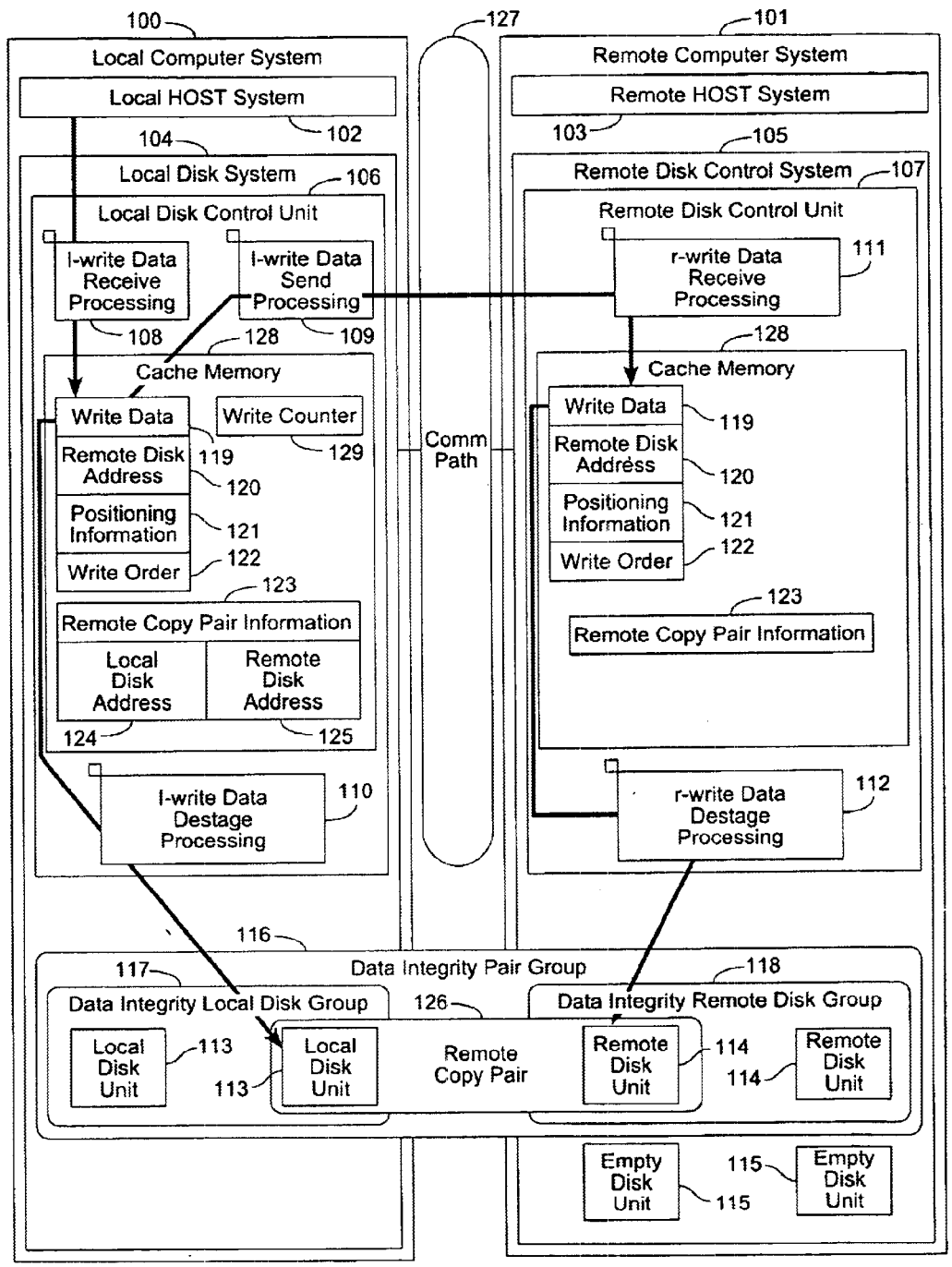
FIG. 1 illustrates a computer system according to a first embodiment of the invention in which there is one local disk system and one remote disk system coupled to each other by a communications path.

FIG. 1 illustrates a computer system according to a first embodiment. The local computer system 100 includes a local host system 102 and at least one local disk system 104. The remote computer system 101 includes at least one remote disk system 105. Although a remote host system 103 is depicted, it should be understood that a remote host system is not always necessary for the remote system 104. In particular in some embodiments, the remote disk system may be a stand-alone disk system providing data back-up features or the like for the local host system 102. The local disk system 104 and the remote disk system 105 are connected with each other through a communication path 127. Communication path 127 may be a physical communication line, a logical network, or even a virtual connection. It may use any desired communications media, for example, fiber optics, wireless, twisted pair, etc., and may employ any desired communications protocol, for example, 100 Base FX, TCP/IP, etc.

The local disk system 104 preferably comprises a system having a plurality of hard disk drives, but may also include optical disk drives, flash memory, or other storage media. As such the term disk system, as used herein, is intended to refer to any such generalized storage system. Preferably the local disk system includes a local disk control unit 106 with a cache memory 128. Similarly, the remote disk system 105 includes a remote disk control unit 107 with a cache memory 228. The local disk system 104 includes at least one local disk unit 113 which has a real time copy in a remote disk system 105.

To provide the remote dual copy, remote disk system 105 includes at least a remote disk unit 114 where a real time copy of a local disk unit 113 is stored. The continuous provision of a duplicate copy of data stored on a local disk unit 113 on a remote disk unit 114 is frequently referred to as "remote dual copy." In addition, according to a preferred embodiment of our invention, it also includes an additional disk 115 which is preferably empty because it is not normally used. The pair of a local disk unit 113 and a remote disk unit 114 are referred to as a remote copy pair 126.

A group of remote copy pairs 126 among which data integrity is to be guaranteed are referred to as a data integrity pair group 116. A group of local disk units 113 which belong to one data integrity pair group 116 are called a data integrity local disk group 117. A group of remote disk units 114 which belong to one data integrity pair group 116 are called a data integrity remote disk group 118.

In a first embodiment according to our invention, all of the local disk units 113 which belong to one data integrity local disk group 116 are included in one local disk system 106. Similarly, all of the remote disk units 114 which belong to one data integrity remote disk group 118 are included in one remote disk system 117. Remote copy pair information 123 include a local disk address 124 and a remote disk address 125; the two addresses defining one pair.

In addition to the architecture described above, FIG. 1 also depicts processing of the local disk system 104 and the remote disk system 105 in which write data is transferred between the local disk system 104 and the remote disk system 105. When the transfer of write data between the local disk system 104 and the remote disk system 105 is available, i.e. the communications link 127 is operating (as well as all other necessary components), the condition is referred to herein as the normal state.

A. Normal Operation

Figure 5:
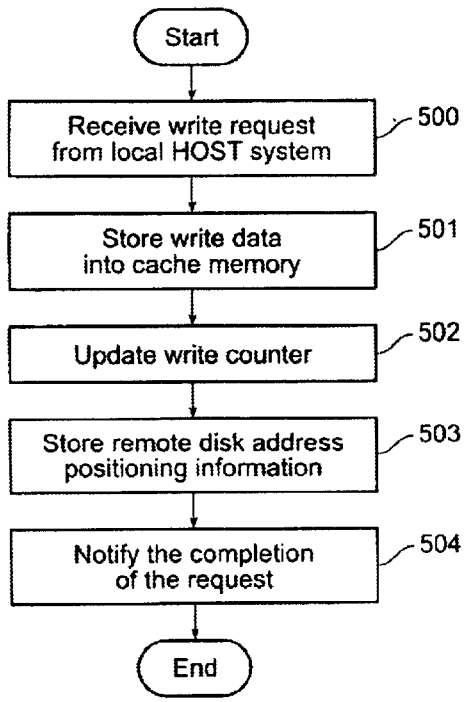
FIGS. 5 to 8 are flowcharts illustrating normal operation of the local and remote disk systems.

Herein, data written to the local disk system is referred to as l data ("l" for local), while data written to the remote disk system is referred to as r data ("r" for remote). The arrows in FIG. 1 illustrate the flow of the l-write data receiving process 108 executed by the local disk system 106 in a normal state. (FIG. 5 is a flowchart for the operation.) As shown in FIGS. 1 and 5, local disk system 104 receives a write request from a local host system 102 (step 500). The write request specifies the address information for the local disk unit 113 and the position (track and sector) of the disk unit where the data is to be stored. Then, the local disk system 106 receives the write data 119 stores it in cache memory 128 (step 501). Here, just as whenever local disk system 104 receives a write request from a local host system 102, a write counter 129 is updated. This is performed by the local disk system 104 copying the contents of write counter 129 into a write order buffer 122 and updating write counter 129 (step 502). By referring to remote copy pair information 123 in remote disk address portion 120 of cache memory 128, the local disk system 104 determines a remote disk address 120 which belongs to the same remote copy pair as local disk unit 113 specified by the received write request. The information is stored, including the positioning information 121 specified the received write request, in cache memory 228 (step 503). Finally, local disk system 104 notifies the host of the completion of the write request (step 504).

Figure 6:
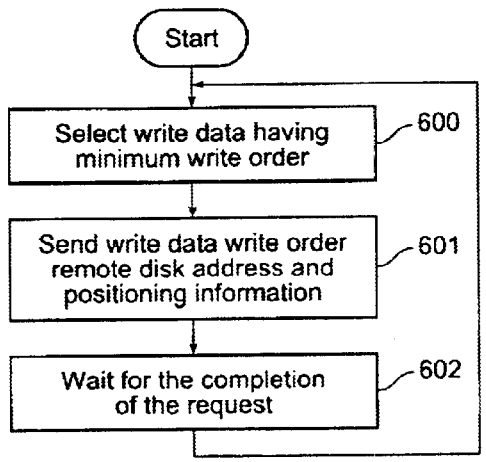

Once the request is complete, or after a series of write requests have been processed, the data must be sent to the remote disk system for writing onto the remote disks. The l-write data send process 109 executed by a local disk system in a normal state is shown by the flowchart of FIG. 6. This process may be performed asynchronously with the processing of write requests at the local disk system 104. In particular, the local disk system 104 selects write data 119 whose write order 122 is a minimum (enabling fastest writing of the data), and sends the write data 119, the write order 122, the remote disk address 120 and the position information 121 to the remote disk system 105 (step 600). Then the local disk system waits for notification of the completion of the transfer of write data from the remote disk system 105 (step 601). After the local system receives notice of completion of the transfer of the write data, the local disk unit returns to step 600 to await (or start) the next write data transfer.

Figure 7:
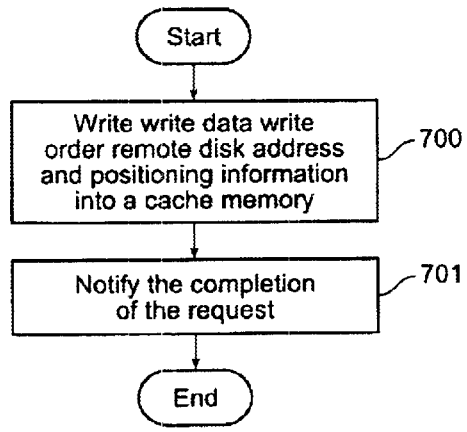

The operation of the r-write data receive process 111 executed by the remote disk system 105 when it receives write data 119, its writing order 122, the remote disk address 120, and the position information 120 from a local disk system 104 is shown by the flowchart in FIG. 7. The remote disk system 105 stores the write data 119, its writing order 122, the remote disk address 120, and the position information 120 into a cache memory 128 (step 700). Then, remote disk system 105 notifies the local disk system 104 of the completion of the transfer of write data 119 (step 701).

Figure 8:
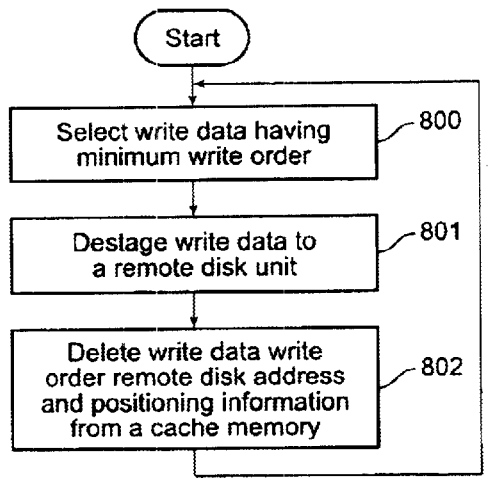

FIG. 8 is a flowchart of the operation of the r-write data destage processing 112 by a remote disk system 105 when the remote disk system 105 writes write data 119 into a remote disk unit 114. Having selected the write data 119 whose write order 122 is a minimum (step 800), the remote disk system writes the data 119 in a remote disk unit 114 according to the corresponding remote disk address and positioning information (step 801). Then, the remote disk system deletes the write data 119, its write order information 122, the remote disk address 120, and the position information 121 from a cache memory 228 (step 802). At this time, data integrity is preserved in the sense that the remote disk now has a copy of the data which was written onto the local disk. After this step, the remote disk system 105 returns to step 800 to schedule the next set of operations and destaging.

B. Suspend Operation

Figure 2:
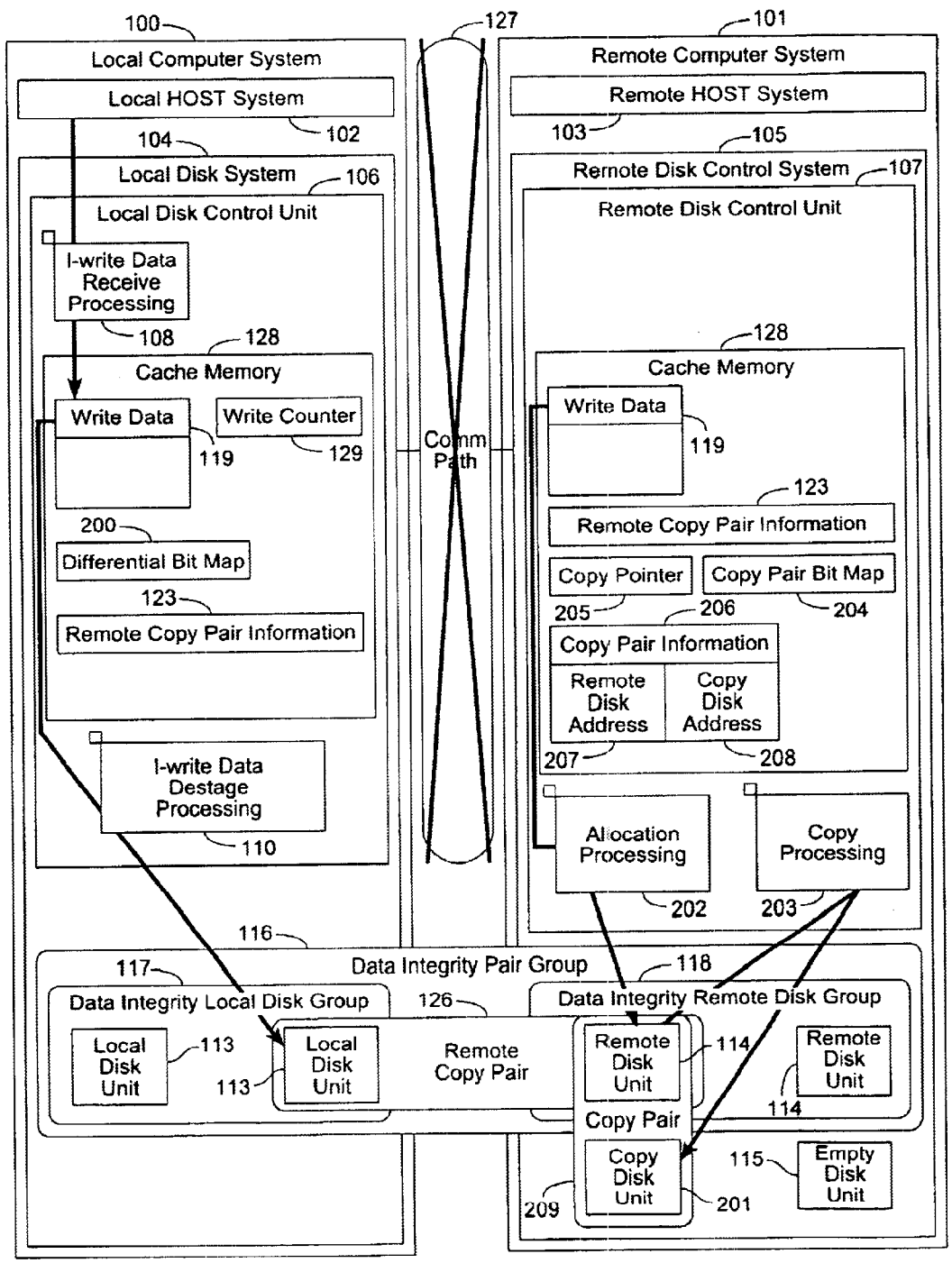
FIG. 2 illustrates the operation of the local disk system and the remote disk system when the transfer of write data from the local disk system over the communications path to the remote disk system is prevented.

FIG. 2 is a diagram which illustrates the operation of local disk system 104 and remote disk system 105 when the transfer of write data 119 to a remote disk system 105 is not possible, for example, because the communications path 127 has failed. This state, in which the transfer of write data 119 to the remote disk system 105 is precluded, is referred to herein as the "suspend" state.

Figure 9:
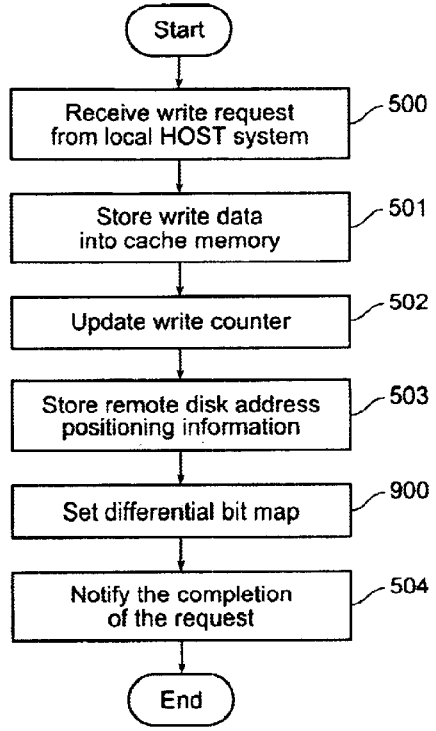
FIGS. 9 to 11 are flowcharts illustrating operation of the local and remote disk systems when the communications path fails.

FIG. 9 is a flowchart of the process flow of the r-write data receive process 108 executed by a local disk system 104 in a suspend state. It illustrates the operation when the local disk system 104 receives a write request from a local host system 102. In the following description only the differences from the normal process operation (described above) are explained. As it operates, the local system maintains a differential bit map which tracks the correlation between the local system and the remote system. In normal operation this bit map will show that the remote disk system "mirrors" the local disk system.

In a suspend condition, the differential bit map 200 in the local disk system 104, however, shows the differences between the data on local disk unit 113 and the data on remote disk unit 114. (Each bit corresponds to a position on the local disk unit 113 which belong to a data integrity disk group 117.) Local disk system 104 will turn the corresponding bit on according to local disk unit address 120 and position information 121 specified by the received write request (step 900). But, of course, in the suspend condition, local disk system 104 cannot send write data 119 to remote disk system 105.

Figure 10:
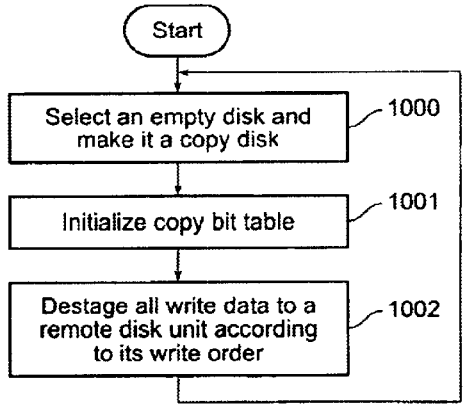

The allocation operation 202 executed by a remote disk system 105 in a suspend state is shown by the flowchart of FIG. 10. The remote disk system can recognize the suspend condition because it cannot communicate with the local disk system 104. Remote disk system 105 selects one empty disk unit 115 for each remote disk unit 114. Herein, we refer to each selected empty disk unit 115 as a copy disk unit 201 (step 1000). A pair (formed temporarily) consisting of a remote disk and a copy disk is termed a copy pair 209. Copy pair information 206 include a remote disk address 207 and each copy disk address 208 to form one temporary pair 209. Copy pair bit map 204 tracks the differences between the data on a remote disk unit 114 and the data on a copy disk unit 201. Each bit corresponds to each position on all the remote disk units 114 which belong to all of the copy pairs 209. Remote disk unit 115 first turns all bits on (step 1001). Then the remote disk system 105 destages all write data 122 received in the normal state (as opposed to the suspend state) in the cache memory 228 to remote disk units 115 according to the writing order 119. It then deletes the write data 119, its writing order 122, the remote disk address 120, and the position information 121 from cache memory 228 (step 1002).

Figure 11:
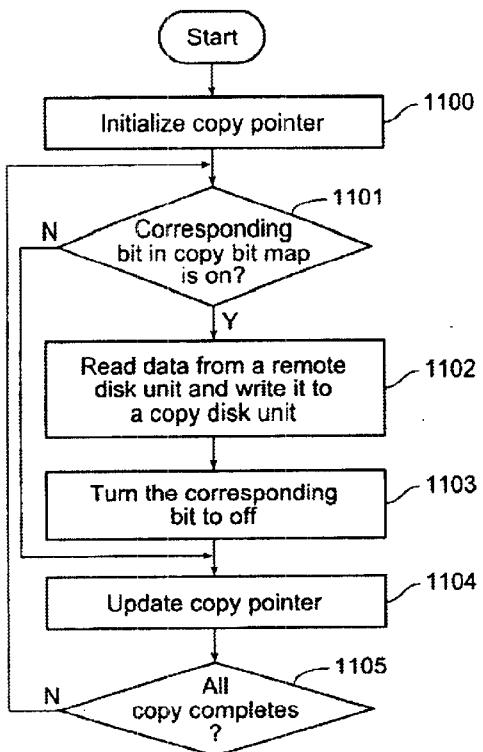

FIG. 11 is a flowchart of the copy operation 203 for copying data from one remote disk to the empty disk 115. The process is executed by the remote disk system 105. A copy pointer 202 illustrates the address of the disk position at which the copy process has been completed. Copy pointer 205 exists for each copy pair 209. Remote disk system 105 first sets an initial value for copy pointer 205 (step 1100). Then, it checks whether the copy pair bit 204 corresponding to the position to be copied is on (step 1101). When the bit is on, the remote disk unit reads the data from the position to be copied on a remote disk unit and destages the data into the temporary disk unit (step 1102). Then remote disk unit 105 turns off the corresponding bit in temporary pair bit map 204 (step 1103) and updates the copy pointer 205 (step 1104). Next the remote copy checks whether the copy processing has been already been completed (step 1105). If not, then the copy operation for the next position is started.

C. Recovery Operation

Figure 3:
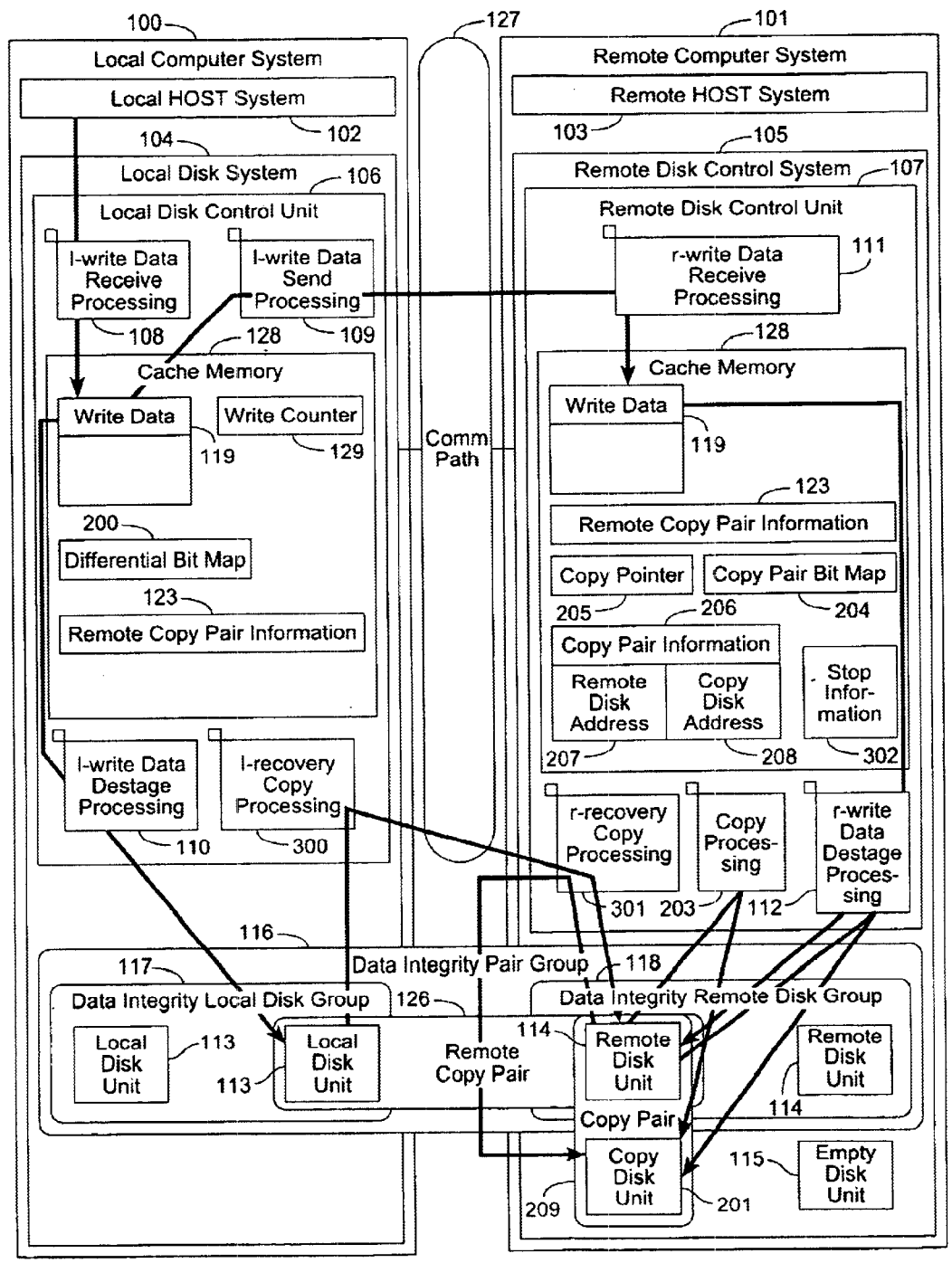
FIG. 3 illustrates the data recovery copy operation after the communications path is reestablished in which the local disk system and the remote disk system restore the original remote disk volume.
Figure 12:
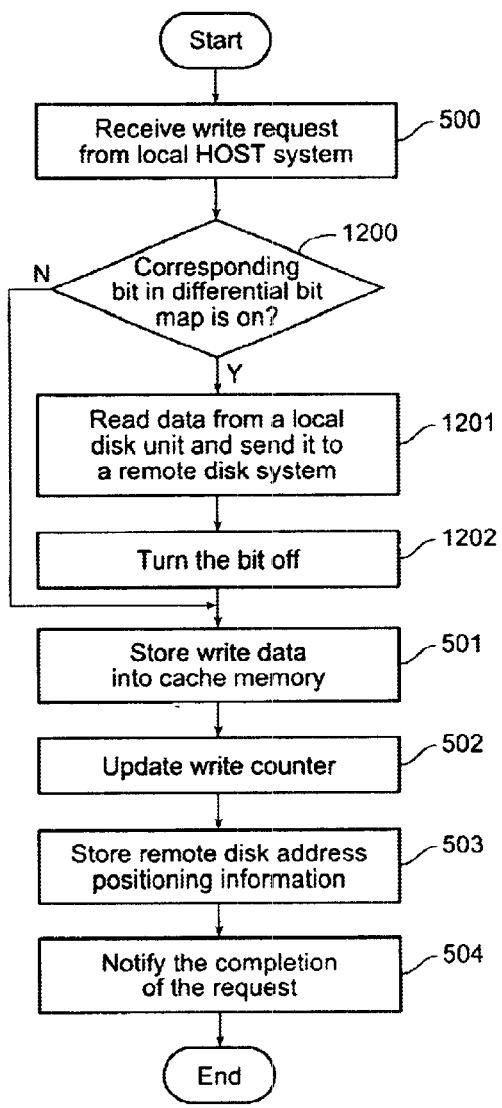
FIGS. 12 to 16 are flowcharts illustrating data recovery operations for an "old" volume.

After a communication path is re-established between the local system and the remote system, it is desirable to restore data integrity. FIG. 3 illustrates the operation of local disk system 104 and remote disk system 105 when the data recovery copy is executed after re-establishment of the communication path. This state is referred to as the recovery state. FIG. 12 is a flowchart of the appropriate operations, with only differences compared to normal processing explained. Local disk system 104 checks whether the corresponding bit in a differential bit map 200 is on, relying on the local disk address and the position information 121 specified by the received write request (step 1200). If the bit is on, local disk system 104 executes the subsequent processing. The local disk system reads the data from the position on local disk unit 113 and sends the read data, the remote disk address, and the position information, to the r-recovery copy processing 301 in remote disk system 105 (step 1201). Then, local disk system 104 waits for notification of the completion of the transfer from the remote disk system 105. It then turns off the corresponding bit in differential bit map (step 1202).

Figure 13:
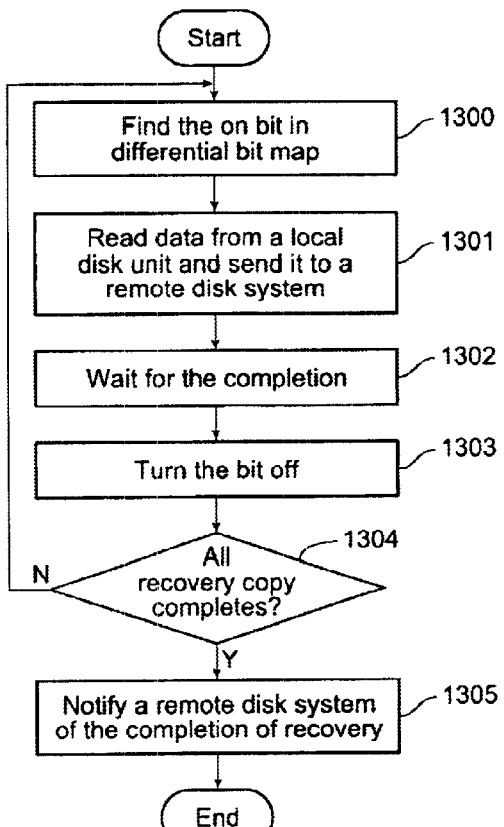

FIG. 13 is a flowchart of the l-recovery copy processing 301. The local disk system finds the appropriate bit is on in differential bit map 200 (step 1300). Next, the local disk system 104 reads the data from the position on local disk unit 113 and sends the data, the remote disk address and the position information, to the r-recovery copy processing in remote disk system (step 1301). Then, it waits for a notification of the completion of transfer from remote disk system 105 (step 1302). After it receives notice of completion, the local disk system 104 turns the corresponding bit off in the differential bit map 200 (step 1303). After that, the local disk system 104 checks whether all the bits are off. (step 1304) If all the bits are not off, the local disk system 104 returns to step 1300 to address any remaining "on" bits. When all the bits are off, local disk system 104 notifies remote disk system 105 of the completion of the recovery copy (step 1305).

Figure 14:
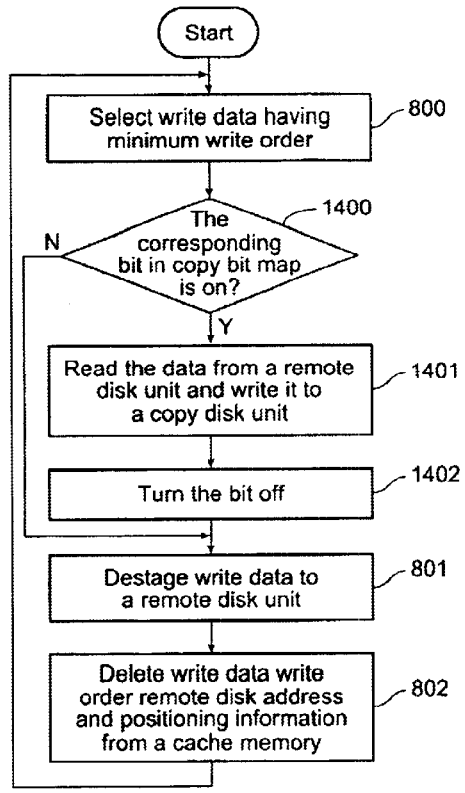

In recovery state, the both the l-write data send process 109 executed by local disk system, and the r-write data receive process 111 executed by remote disk system 105, are the same as in the normal state. The flow of the r-write data destage process 112 by the remote disk system 105 in a recovery state is shown in FIG. 14. Compared to the normal state, remote disk system 104 checks whether the bit in the copy pair bit map 204 which corresponds to the position of write data 119 to be destaged is on (Step 1400). When the bit is on, the remote disk unit 105 reads the data from the position to be copied onto remote disk unit 114 and writes the data into a copy disk unit 201 (step 1401). After that, remote disk unit 105 updates a copy pointer 205 and turns off the corresponding bit in copy pair bit map 204. (step 1402). After that, remote disk system 105 executes the destage processing.

Figure 15:
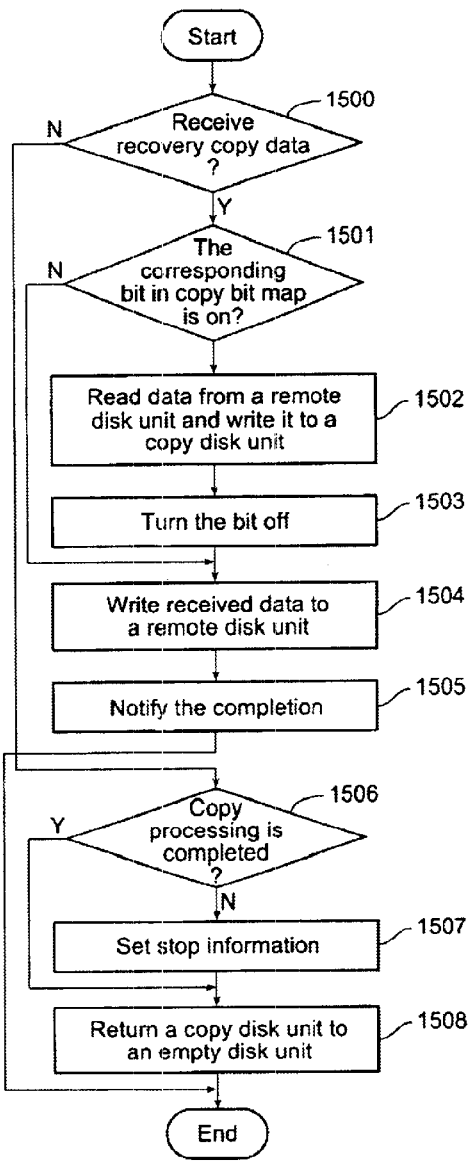

FIG. 15 is a flowchart for the r-recovery copy process 301 executed by remote disk system 105. When remote disk system 105 receives the data, the remote disk address information, and the positioning information from local disk system 104 (step 1500), local disk unit 104 executes the next process. Remote disk system 104 checks whether the appropriate bit in copy pair bit map 204 corresponding to the position of write data to be written is on (step 1501). If the bit is on, remote disk unit 114 reads the data from the position to be copied on remote disk unit 114 and writes the data into a copy disk unit 201. Then it turns the bit off (step 1503). Next the remote disk system 105 writes the received data from local disk system 104 onto remote disk unit (step 1504). Finally, the remote disk unit 105 issues a notification of the completion of the requested process (step 1505).

When remote disk system 105 receives notice of the completion of the recovery process from local disk system 104, remote disk system 105 executes the next process. At first, remote disk system 105 checks whether copy processing 203 is occurring between the disk unit 104 and a copy disk unit 201 (step 1506). If it is not completed, remote disk system sets stop information to suspend the copy process (step 1507). If copy processing is completed, remote disk system releases copy disk unit and again makes it an empty disk unit (step 1508).

Figure 16:
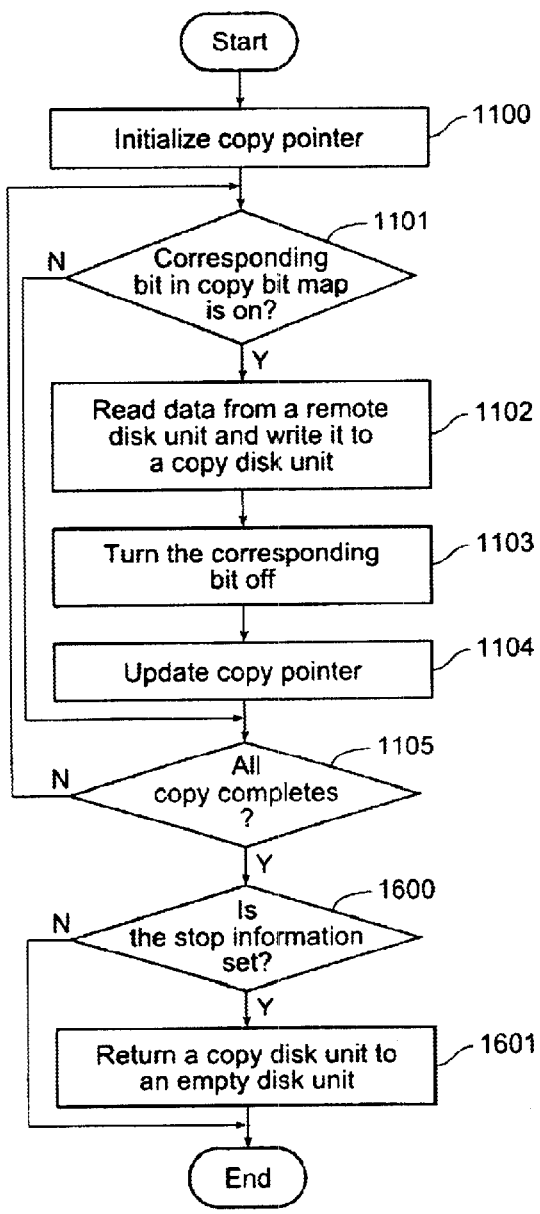

The copy processing 203 executed by remote disk system 105 in a recovery state, which is shown in FIG. 16 is as follows. As above, only the differences from the processing in a suspend state are explained. In this case, after copy processing between remote disk unit 114 and copy disk unit 201, remote disk system 105 checks whether stop information 302 is set (step 1600). If it is set, remote disk system 105 releases copy disk 201 and makes it an empty disk unit 115 (step 1601).

Figure 4:
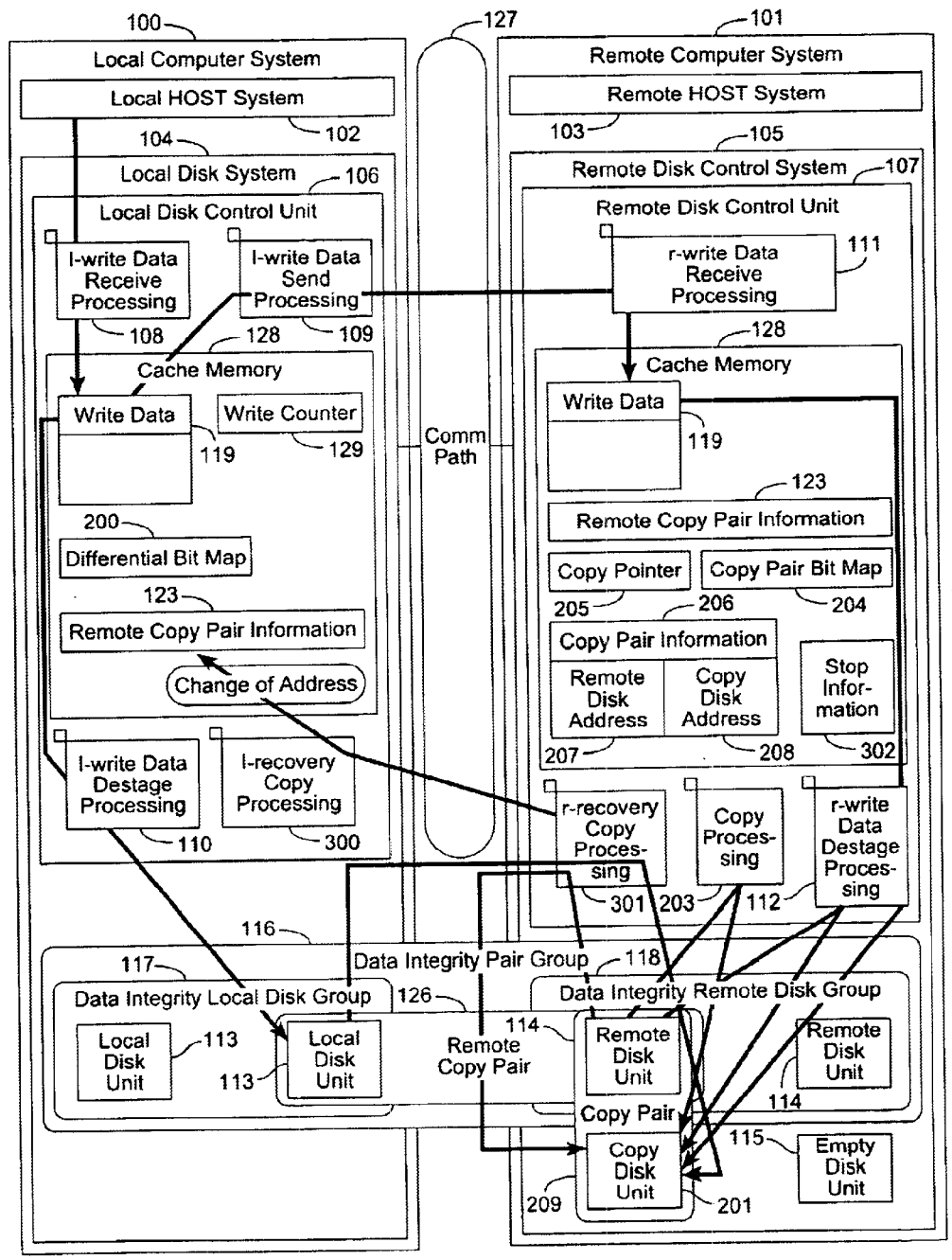
FIG. 4 illustrates the data recovery copy operation after the communications path is reestablished in which the local disk system and the remote disk system restore an additional remote disk volume.

FIG. 4 illustrates operation of the local disk system and the remote disk system when the other data recovery copy between local disk system and remote disk system is being executed after recovery of the communication path. The basic difference from the process of FIG. 3 is that in the remote disk system, r-recovery copy processing 301 writes the received data, not into remote disk unit 114, but into a copy disk unit 201. By doing so, data integrity between the remote disk unit 114 and local disk unit 113 can be assured.

Figure 17:
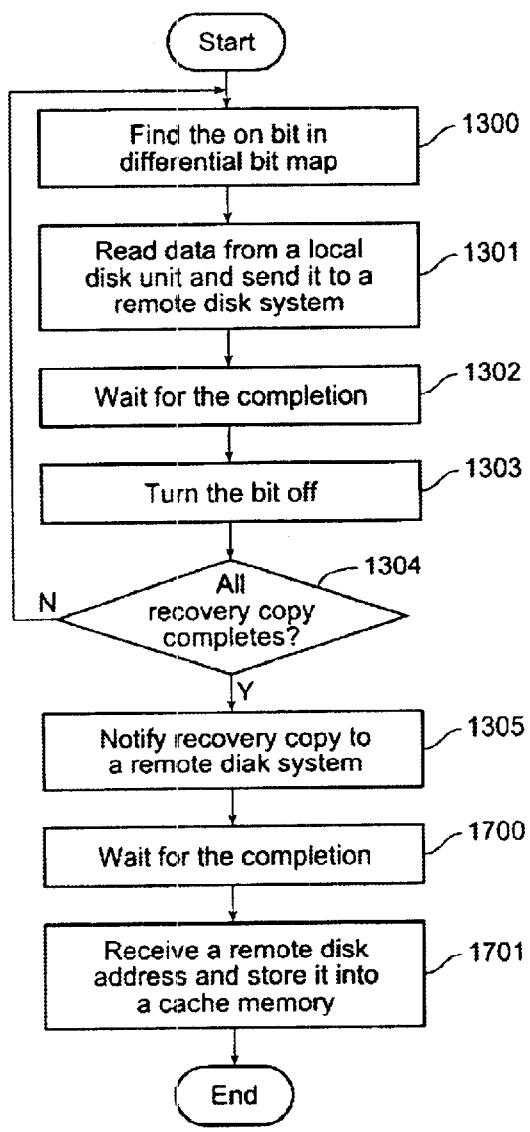
FIGS. 17 to 20 are flowcharts illustrating data recovery operations for an "new" volume.

A flowchart of the l-recovery copy process executed by the local disk system is shown in FIG. 17. Only differences from the process in the flowchart shown in FIG. 13 are explained. In this case, after the local disk system 104 sends notification that the recovery copy is complete, the local disk system 104 waits for notification from the remote disk system 105 (step 1700). In this case, because the recovery copy data is written into copy disk unit 201, copy disk unit 201 must be converted into a new remote disk unit 114 after the recovery copy process is complete. Therefore disk system 104 receives new remote disk information, and updates the remote disk address 125 in remote copy pair information 123 according to the received information (step 1701).

Figure 18:
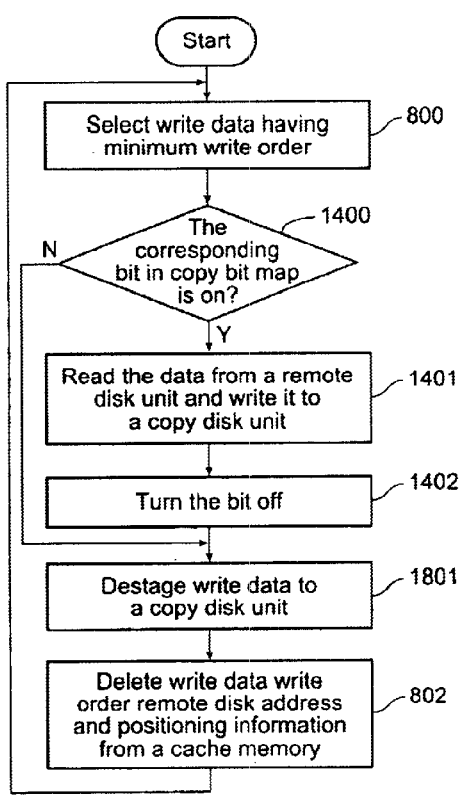

FIG. 18 is a flowchart of the r-write data destage processing 112 for the remote disk system. The difference compared to the flowchart shown in FIG. 13 is that the process executed when write data is destaged, is that a copy disk unit 201 is used in place of the remote disk unit 114 used in FIG. 3 (step 1800).

Figure 19:
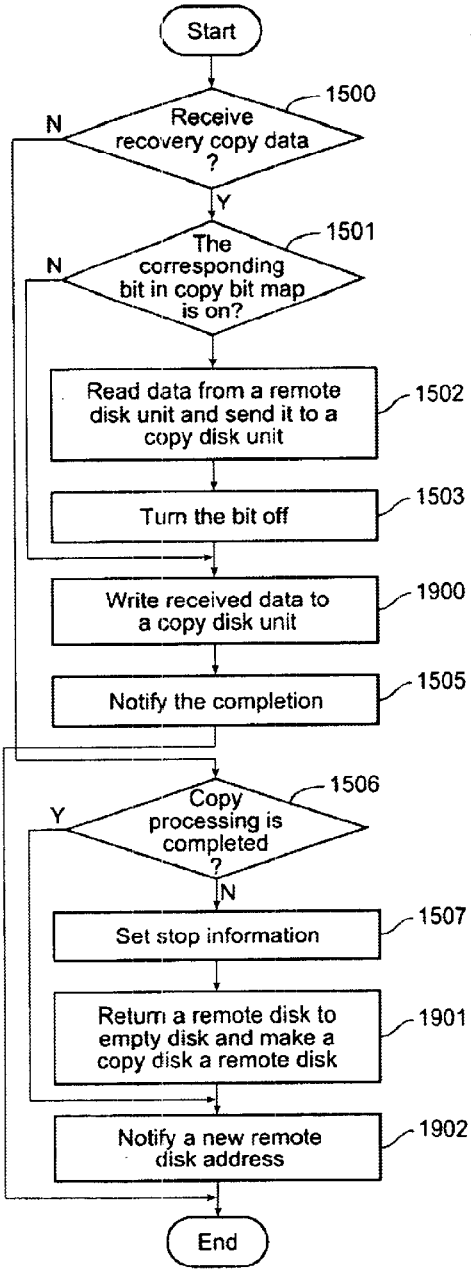

FIG. 19 shows the operation of the r-recovery copy process 301 executed by remote disk system 105. Only differences from the flowchart shown in FIG. 14 are explained. The first difference is that a copy disk unit 201 is used in place of remote disk unit used in FIG. 3 when the data is received from the local disk system (step 1900). In addition, when remote disk system 105 receives the notice signifying completion of the recovery process from local disk system 104, remote disk system 105 releases remote disk 114 and makes it an empty disk unit 115, and makes a copy disk unit 201 a new remote disk 115 (step 1901). Finally, remote disk unit provides notification of the address of a new remote disk (step 1902).

Figure 20:
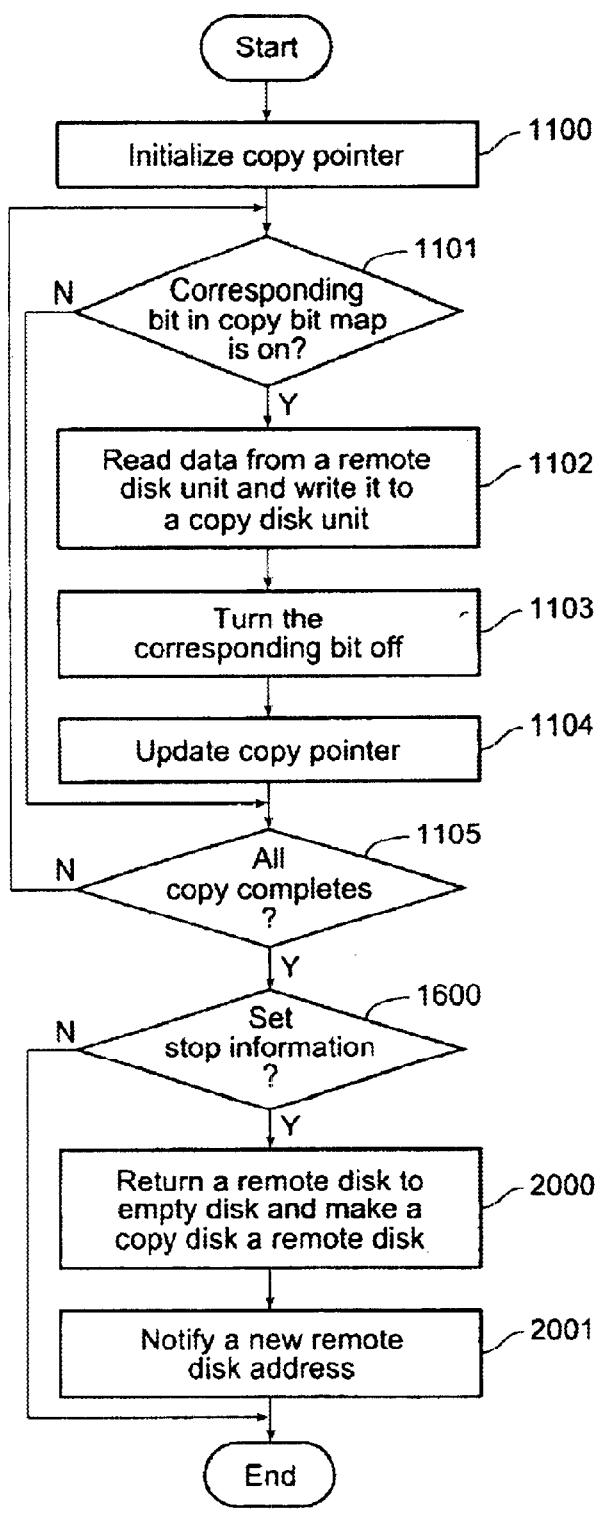

FIG. 20 shows the r-copy processing 301 between remote disk unit 114 and copy disk unit 201 executed by remote disk system 105. Only the differences compared to the flowchart of FIG. 16 are explained. A remote disk system 105 releases remote disk unit 114 and makes it an empty disk unit 115. It also makes a copy disk unit 201 a new remote disk unit 114 (step 2000). Finally, remote disk system 105 provides notification of the address of a new remote disk unit 114 to local disk system 104 (step 2001).

2. Second Embodiment—More than One Local and only One Remote Disk System

Figure 21:
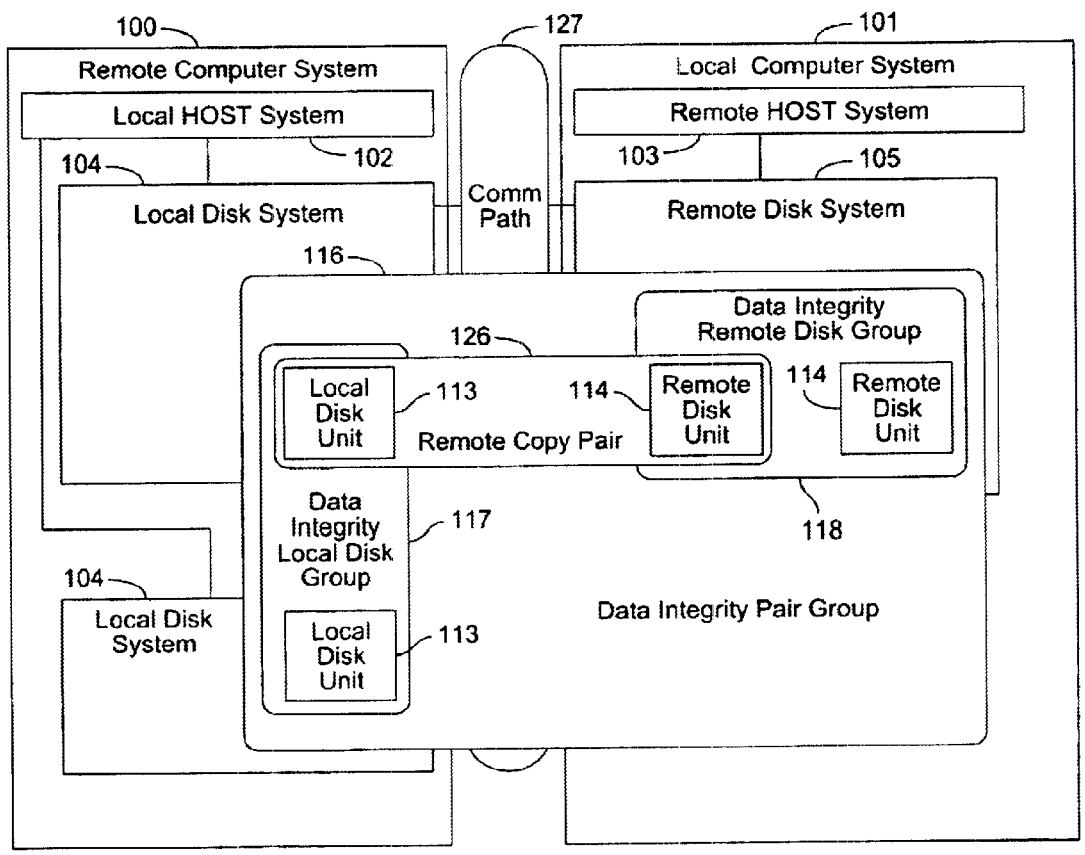
FIG. 21 illustrates a computer system according to a second embodiment of the invention in which there is more than one local disk system and only one remote disk system.
Figure 22:
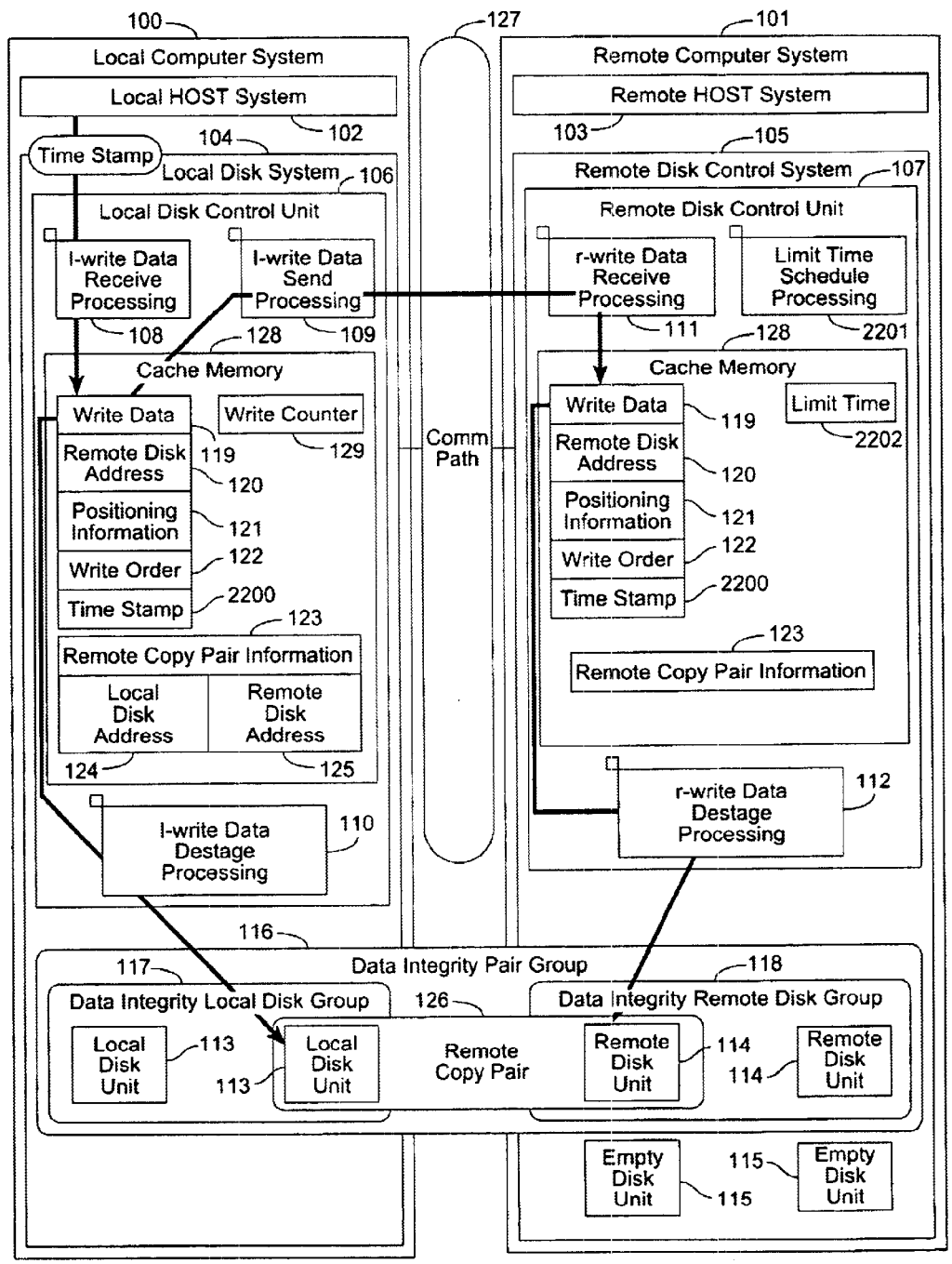
FIG. 22 illustrates a computer system according to a second embodiment of the invention in which there is more than one local disk system and one remote disk system.

FIG. 21 is a diagram illustrating the architecture of a computer system in a second embodiment. Compared to the first embodiment, the second embodiment includes a local disk unit group 117 having disk units 113 which belong to m (more than one) local disk systems 104. FIG. 22 illustrates operation of local disk system 104 and remote disk system 105 in the second embodiment in a normal state. In this system architecture, to realize data integrity, the order of writing to the disks in the remote local disk system must be the same as in the n local disk systems of the local host. To assure correct order of writes among the different local disk systems 104, time stamp 2200, representing the 'time' when the corresponding write request is issued by the local host system is utilized. (If there is more than one local host system 102, a shared clock is assumed to be usable to obtain a time stamp among different local host systems.) In FIG. 21, local disk system 104 receives time stamp 2200 from local host system 102. Time stamp 2200, however, may be generated by local disk system 104 by utilizing a common 'time' among n local disk systems 104.

Figure 26:
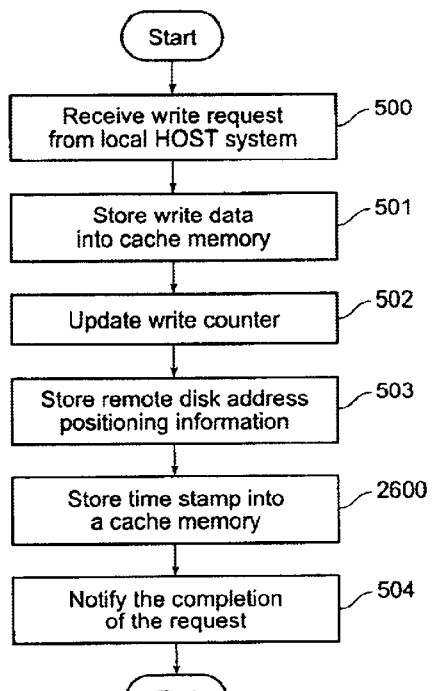
Figure 27:
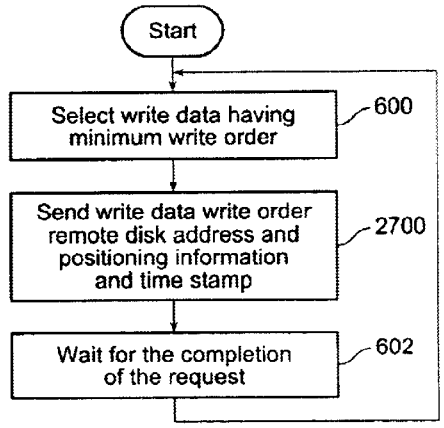

A flowchart of the l-write data receive process 108 executed by the local disk system 104 in a normal state, is shown in FIG. 26. Compared to the first embodiment, the local disk system 104 receives time stamp 2200 from local host system 102 and stores the time stamp 2200 into a cache memory 128 (step 2600). The flow of the l-write data send process 109 executed by the local disk system 104 in a normal state is shown in FIG. 27. Compared to the first embodiment, the local disk system 115 selects write data whose time stamp 2200 is earliest, and sends the write data 119, its writing order 122, the remote disk address 120, the position information 121, and the time stamp 122 to remote disk system 105 (step 2700).

Figure 28:
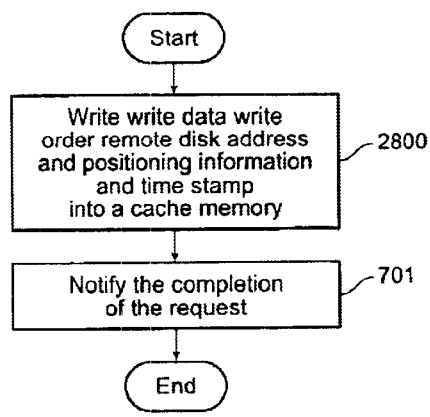

A flowchart of the r-write data receive process 111 executed by the remote disk system 105 in a normal state is shown in FIG. 28. The only difference from the first embodiment is that the remote disk system 105 stores write data 119, its writing order 122, the remote disk address 120, position information 121, and time stamp 2200 into a cache memory 128 (step 2800).

Figure 29:
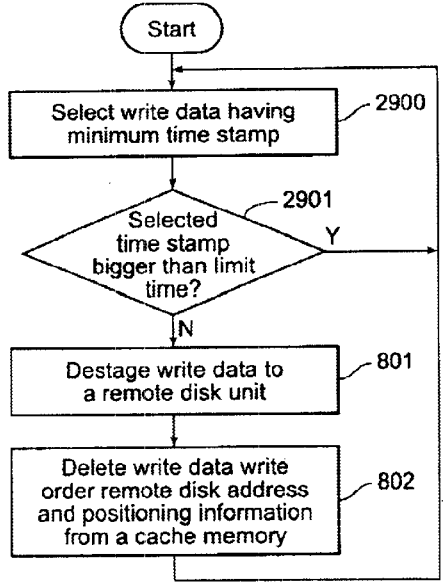

The r-write data destage processing 112 by remote disk system 105 in a normal state is shown in FIG. 29. In the second embodiment, all write data 119 cannot be destaged to remote disk unit 115. Because it is possible that remote disk system 105 has already received write data whose time stamp is, for example, 7:00 from one local disk system 104, but it has not yet received a write data whose time stamp is 6:50 from the other local disk system 104, additional control is needed. A limit time schedule process 2201 decides the maximum time to permit destaging to remote disk unit 114, and stores this information as limit time 2202 in cache memory 128. One process for performing this operation is described in JP-A-11-085408. Remote disk unit 105 selects a write data 119 which has the minimum time stamp 2200 (step 2900). Then, it compares time stamp 2200 with limit time 2202 (step 2901). If time stamp 2200 is newer than limit time 2202, remote disk system 105 stops destaging the write data 119.

Figure 23:
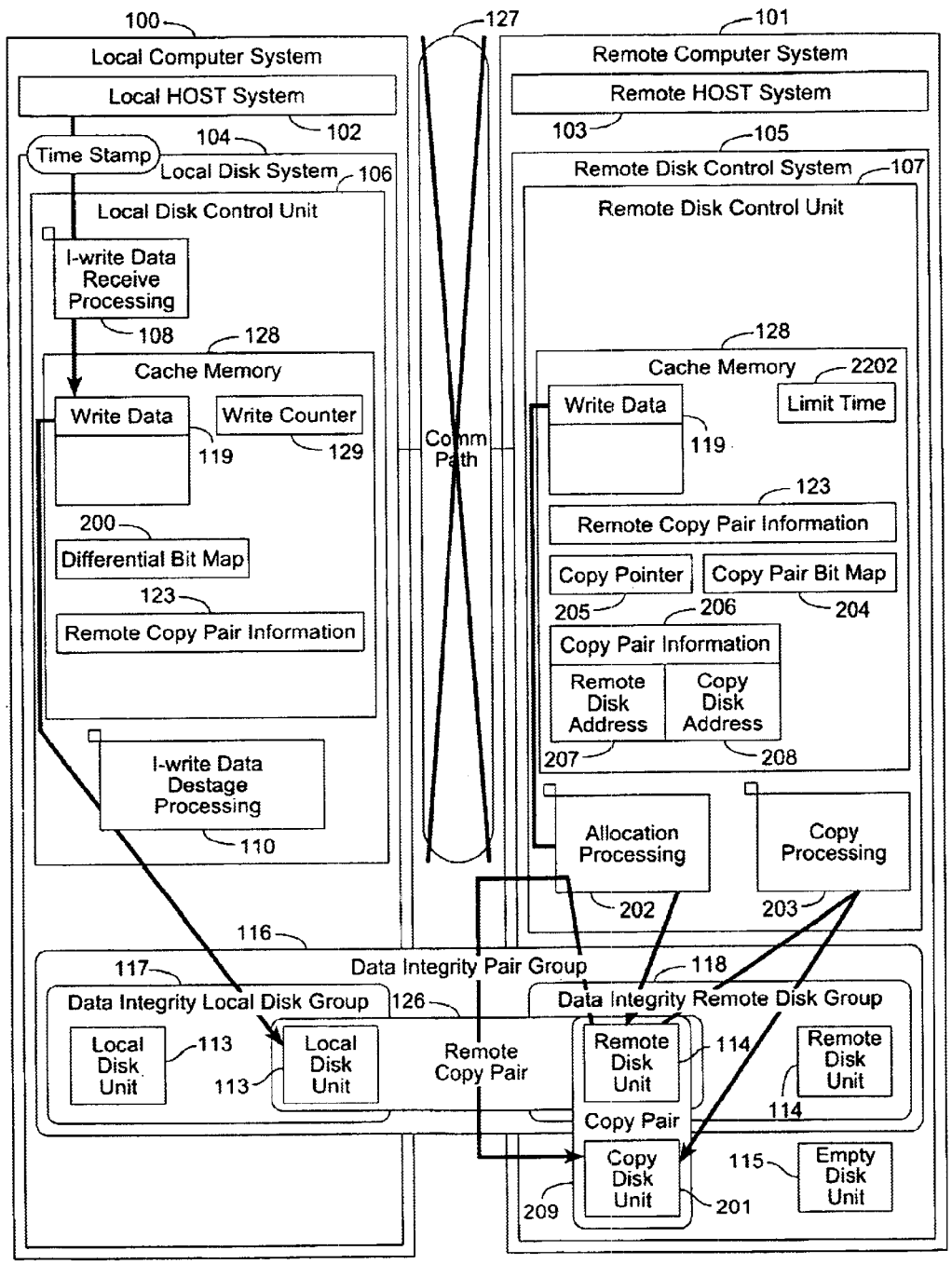
FIG. 23 illustrates the operation of the plural local disk systems and the one remote disk system when the transfer of write data from the local disk system over the communications path to the remote disk system is prevented.
Figure 30:
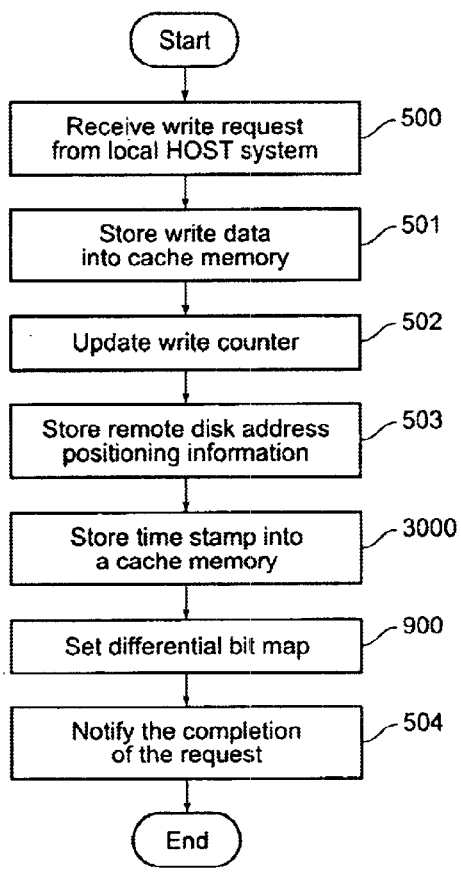
Figure 31:
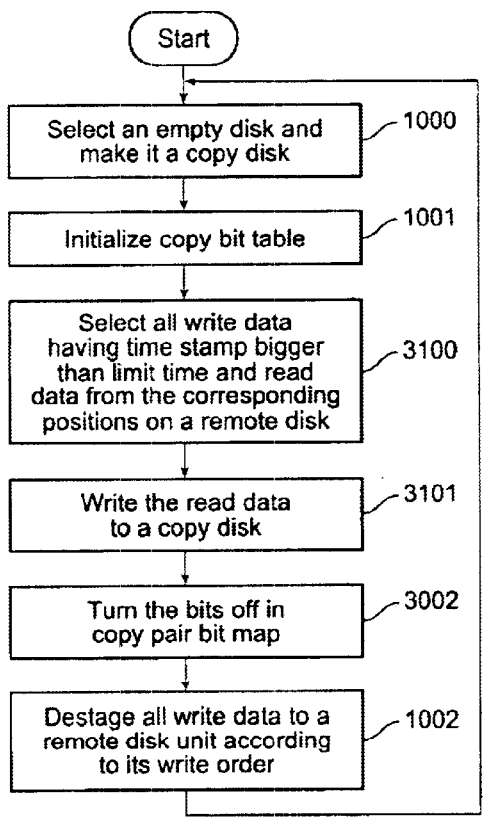

FIG. 23 is a diagram illustrating the operation of local disk system 104 and remote disk system 105 in a suspend state. The flow of the r-write data receive process 108 by the local disk system in a suspend state is shown in FIG. 30. The local disk system 104 receives time stamp 2200 from local host system and stores time stamp 2200 in cache memory 128 (step 3000).

The allocation processing 202 executed by remote disk system 105 in a suspend state is shown in FIG. 29. Before remote disk system 105 tries to destage all write data 119 received in a normal state in cache memory 128 to remote disk units 114, remote disk system 105 reads data from the positions of the remote disk units 114 corresponding to all write data which have time stamp 2200 newer than limit time 2201 (step 3100), and then writes all the read data to the corresponding position on the copy disk unit 201 (step 3101). After that, remote disk system turns off all the bits of the corresponding positions in copy pair bit table 204 (step 3102). The copy processing 203 executed by remote disk system in a suspend state is the same as in the first embodiment.

Figure 24:
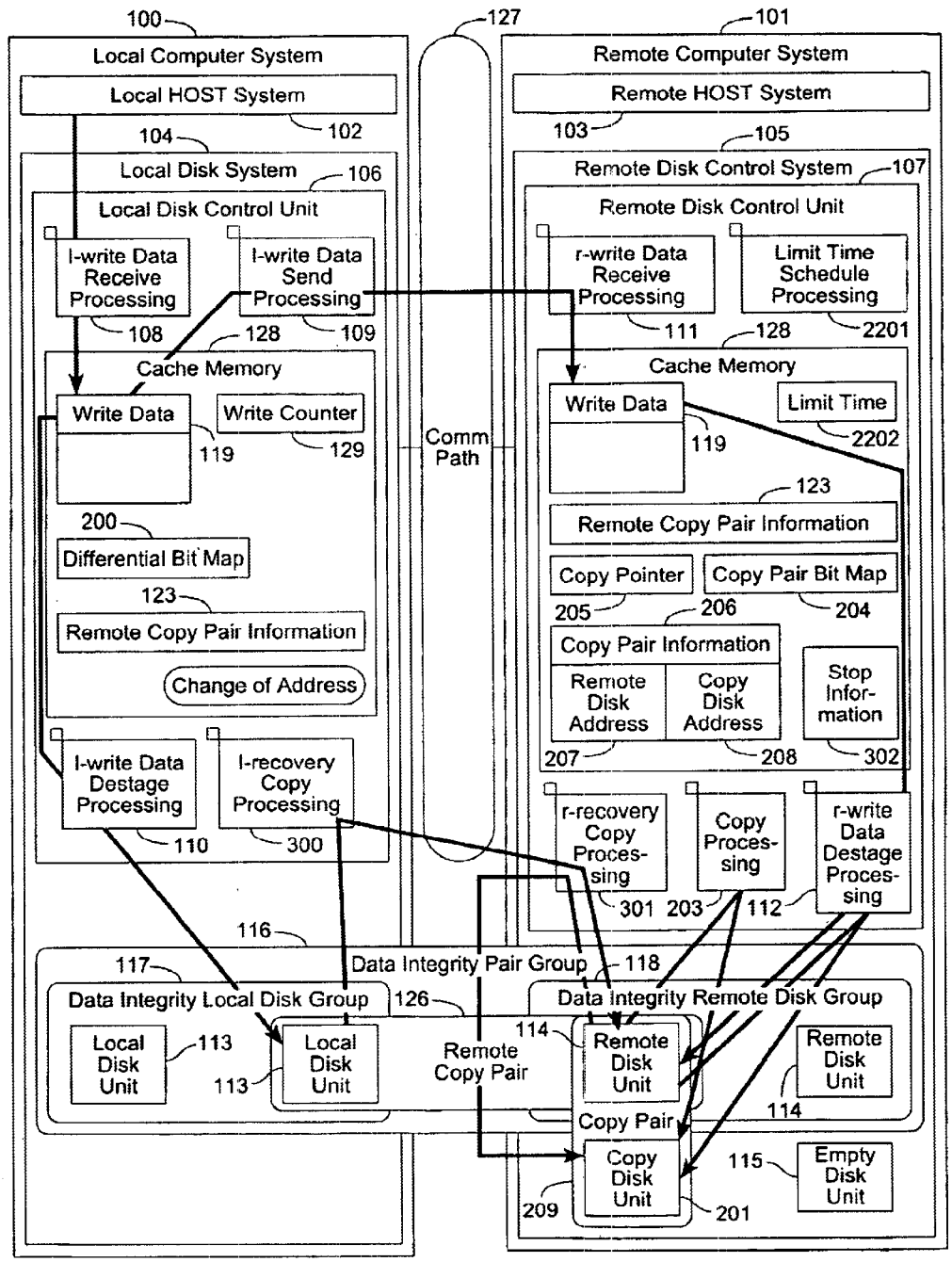
FIG. 24 illustrates the data recovery copy operation after the communications path is reestablished in which the plural local disk systems and the remote disk system restore the original remote disk volume.

FIG. 24 illustrates the operation of local disk system and remote disk system in a recovery state of the second embodiment. FIG. 32 is a flowchart for the l-write data receive process 108 executed by local disk system 104 in a recovery state. Local disk system 104 receives time stamp 2200 from local host system 102 and stores time stamp 2200 into cache memory 128 (step 3200).

In the second embodiment, in the recovery state, the l-write send process 109 and the r-write data receive process 111 are the same as in the normal state. l-recovery copy process 300, r-recovery copy process 301, and copy process 203 are the same as in the first embodiment.

The r-write data destage processing 112 by remote disk system 105 in a normal state is shown in FIG. 33. The remote disk system 105 selects write data 119 which has the oldest time stamp 2200 (step 3300). Then it compares time stamp 2200 with limit time 2202 (step 3301). If time stamp 2200 is older than limit time 2202, remote disk system 105 stops destaging the write data 119.

Figure 25:
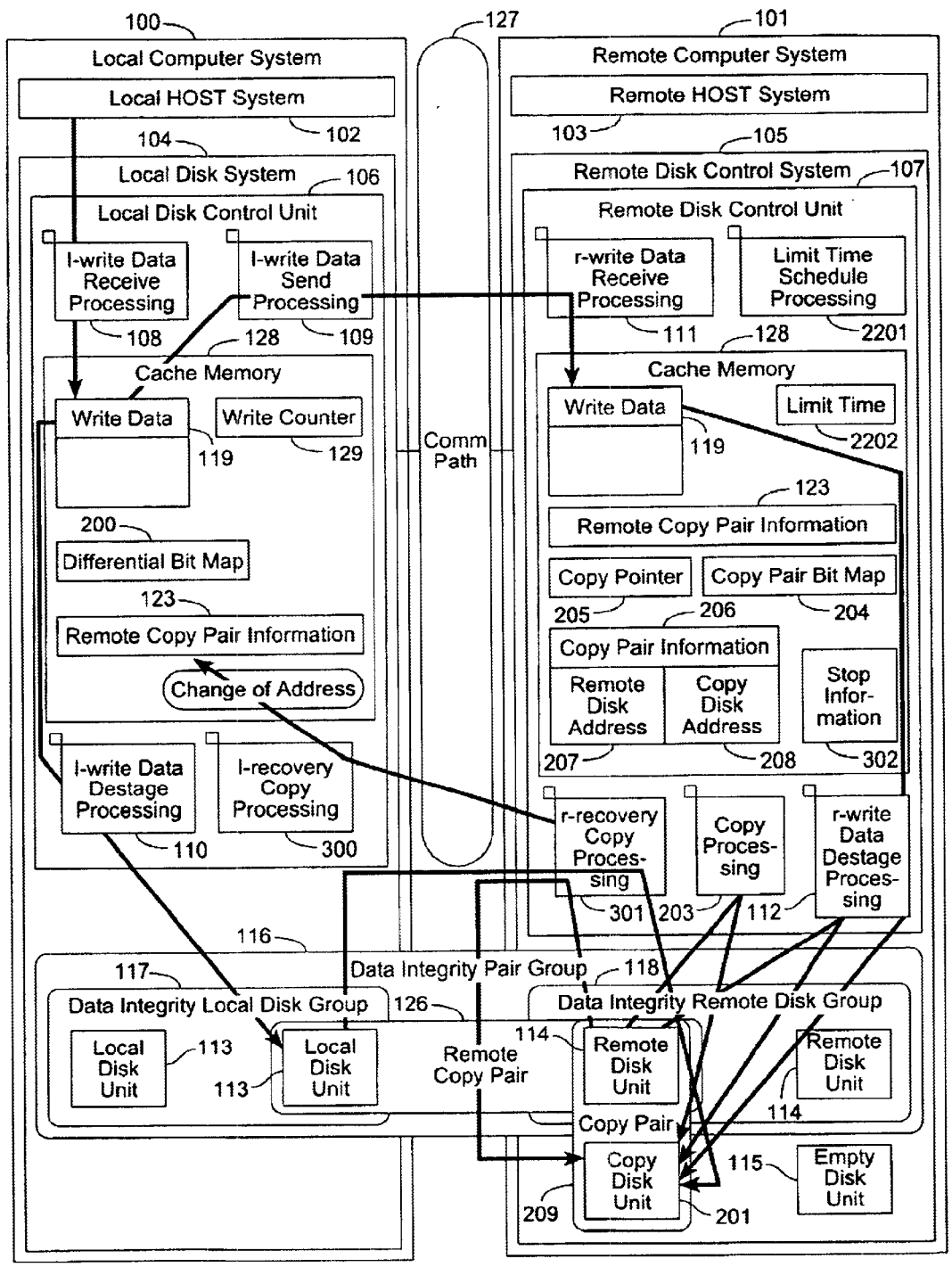
FIG. 25 illustrates the data recovery copy operation after the communications path is reestablished in which the plural local disk systems and the remote disk system restore an additional remote disk volume.

FIG. 25 illustrates the operation of the local disk system and the remote disk system in the other recovery state of the second embodiment. The operation shown in FIG. 25 in the second embodiment corresponds to the operation shown in FIG. 4 in the first embodiment.

In the second embodiment, the l-write sending processing 109 and the r-write data receive processing 111 in a recovery state is the same as in the normal state. The l-recovery copy process 300, r-recovery copy process 301, and copy process 203 are also the same as in the first embodiment. l-write data receive process 109 in FIG. 24 is also the same as the process in FIG. 23.

Figure 34:
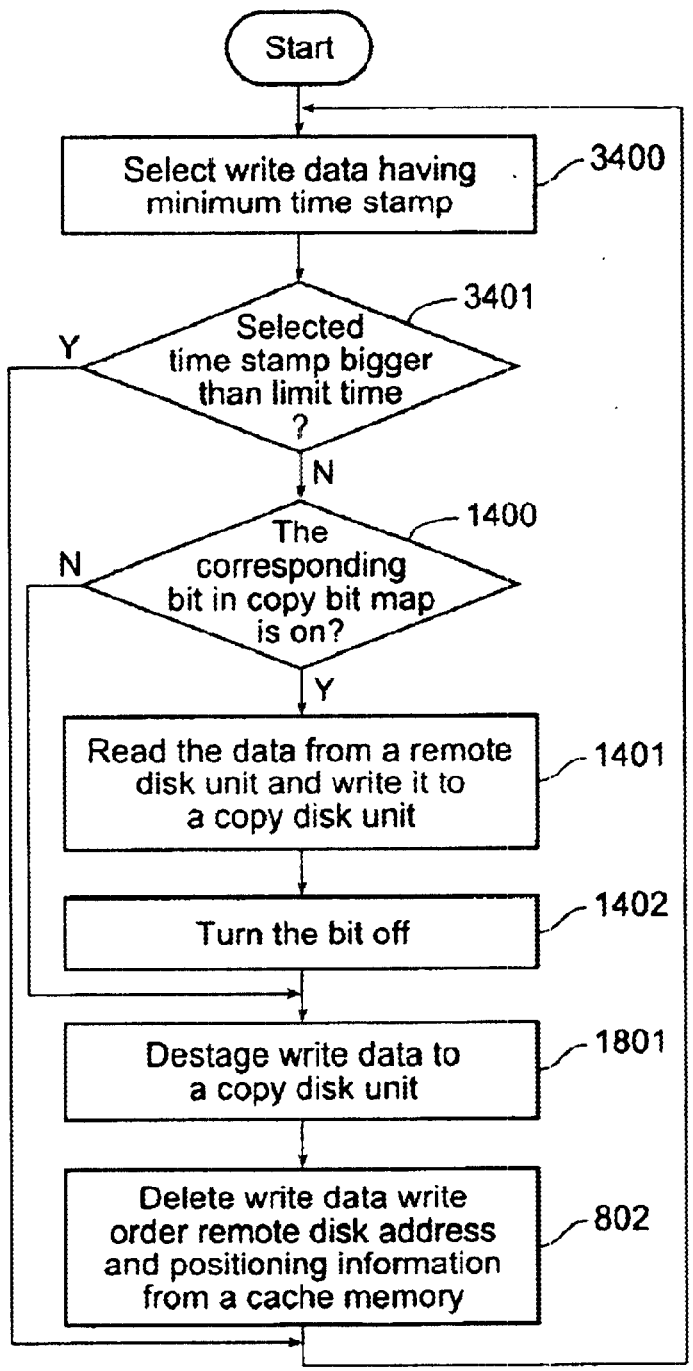

The r-write data destage processing 112 by the remote disk system in a normal state is shown in FIG. 34. The remote disk system 105 selects the write data 119 which has the oldest time stamp 2200 (step 3400). It compares time stamp 2200 with limit time (step 3401). If time stamp 2200 is newer than limit time 2202, remote disk system 105 stops destaging the write data 119.

Figure 35:
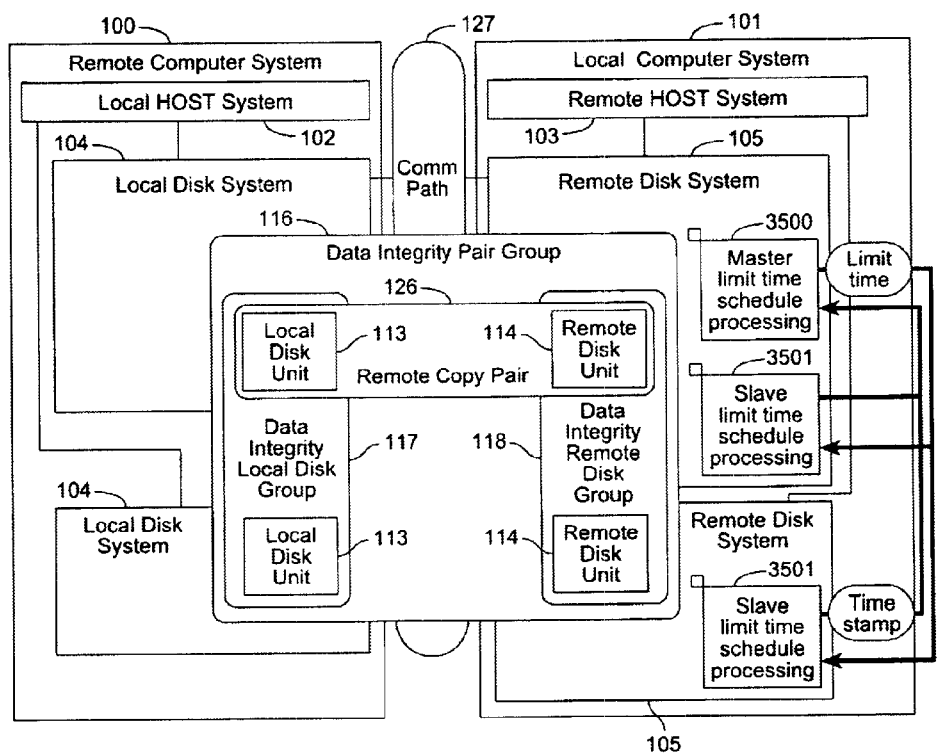
FIG. 35 illustrates a computer system according to a third embodiment of the invention in which there are plural local disk systems and plural remote disk systems coupled to each other by a communications path.

3. Third Embodiment—More than One Local and More Than One Remote Disk System FIG. 35 illustrates a third embodiment of the computer system. The difference between the third embodiment and the other embodiments is that a data integrity local disk unit group 117 of third embodiment includes the local disk units 113 which belong to m (more than one) local disk systems 104 and a data integrity remote disk unit group 118 includes the remote disk units 114 which belong to n (more than one) remote disk systems 105. In this architecture, to guarantee data integrity in the total remote disk systems 105, time stamp information must be exchanged among the remote disk systems 105. Because in this embodiment it is possible that one remote disk system 105 has already received write data 119 whose time stamp 2200 is, for example, 7:00, but the other remote disk system 105 has not yet received write data 119 whose time stamp 2200 is 6:50, each slave limit time schedule process 3501 sends information about the time stamp to a master limit time schedule process 3500. Then, a master limit time schedule process 3500 decides the maximum time to permit destaging to a remote disk unit, and sends this information to each slave time limit scheduling processing 3501. Next, each slave limit time schedule processing 3501 stores this information as limit time 2202 into each cache memory 128. Examples of these processes are described in JPN-A11-085408. Because limit time 2202 is stored in a cache memory 128 in each remote disk system 105, all other processes other than a master time limit schedule processing 3500 and remote limit time schedule processing 3501 are same as the ones in the second embodiment.

As explained, this invention provides an asynchronous remote copy system which assures data integrity even when data communication between a local disk system and a remote disk system is interrupted. As also described, the invention has applicability to several remote copy system architectures—architectures having one local disk system and one remote disk system, more than one local disk system and only one remote disk system, and more than one local disk system and more than one remote disk system.

The preceding has been a description of the preferred embodiment of the invention. It will be appreciated that deviations and modifications can be made without departing from the scope of the invention, which is defined by the appended claims.

What is claimed is:

1. A method for providing data integrity in a storage system having a local storage unit including local data storage media and a remote storage unit including remote data storage media, the local storage unit being coupled to the remote storage unit by a communications link, the method comprising:

providing at least one additional remote data storage media in the remote storage unit;

upon interruption of the communications link:
    maintaining a first record of transactions which have been stored in the local data storage media and have not yet been stored in the remote data storage media;
    copying data from the remote data storage media to the additional remote data storage media, and maintaining a second record of the data copied to the additional remote data storage media;

upon restoration of the communications link:
    using the first record of transactions to determine which transactions have not been written to the remote storage unit, and sending those transactions to the remote storage unit; and
    in the remote storage unit comparing the transactions received from the local storage unit to the second record and writing new transactions into the additional remote data storage media.

2. A method as in claim 1 wherein the method further comprises upon interruption of the communications link:
    receiving write requests to the local storage unit;
    storing the data in a cache memory;
    storing information about an intended location for storage of the data in the remote storage unit;
    maintaining a record of the write requests to enable determining which requests have been received at the remote disk unit and which have not.

3. A method as in claim 2 further comprising, upon interruption of the communications link, the steps of:
    associating the at least one additional remote data storage media with at least one of the remote data storage media; and
    writing into the at least one additional remote data storage media the data from the corresponding one of the remote data storage media.

4. A method as in claim 1 wherein the step of maintaining the first record comprises maintaining a bit map of the data which has been received by the local storage unit, wherein bits of the bit map indicate a correlation between data which has been received by the remote storage unit and data which has not been received by the remote storage unit.

5. A method as in claim 4 wherein bits in the bit map contents are set based on whether an acknowledgment of receipt of data has been received by the local storage unit in response to sending data to the remote storage unit.

6. A method for recovering data in a storage system having a local storage unit including local data storage media and a remote storage unit including remote data storage media, the local storage unit being coupled to the remote storage unit by a communications link, the method comprising:
    selecting write data having a desired write order from a list of write data;
    selecting data where a bit in a table is on;
    writing the selected data to the remote data storage media;
    turning the bit to off; and
    deleting the selected write data from the list of write data.

7. A method as in claim 6 wherein in the step of selecting data where a bit in a table is on is performed by checking the table, and if the bit is off then deleting the selected write data from the list of write data.

8. A method for providing data integrity in a storage system having a local storage unit including local data storage media and a remote storage unit including remote data storage media and at least one additional remote data storage media in the remote storage unit; the local storage unit being coupled to the remote storage unit by a communications link which has failed, the method comprising upon restoration of the communications link:
    associating the at least one additional remote data storage media with at least one of the remote data storage media;
    using information in the local storage unit regarding what data has been stored in the remote unit, identifying data which has not been written into the remote unit;
    writing the identified data into the at least one additional remote data storage media;
    upon acknowledgment from the at least one additional remote data storage media resetting the information in the local storage unit; and
    repeating the process of the preceding steps until all data which has not been written into the remote unit has been written into the at least one additional remote data storage media.

9. A method as in claim 8 followed by the step of erasing the at least one additional remote data storage media with which the at least one of the remote data storage media was associated.

10. Apparatus for providing security of data in a storage system, the storage system comprising:
    a local storage unit including first data storage media;
    a remote storage unit including second data storage media, the remote storage unit being adapted to be coupled to the local storage unit by a communications path; and
    at least one additional second data storage media in the remote storage unit, the additional second data storage media being used for maintaining a copy of data in a portion of the second data storage media in the event of an interruption of the communications path.

11. Apparatus as in claim 10 wherein the number of additional second data storage media in the remote storage correspond to the number of second data storage media in the remote storage unit.

12. Apparatus as in claim 11 wherein each of the additional second data storage media in the remote storage and each of the second data storage media in the remote storage unit comprise hard disk drives.

* * * * *